(12) United States Patent
Olson et al.

(10) Patent No.: US 6,484,222 B1
(45) Date of Patent: Nov. 19, 2002

(54) SYSTEM FOR INCORPORATING MULTIPLE EXPANSION SLOTS IN A VARIABLE SPEED PERIPHERAL BUS

(75) Inventors: David M. Olson, The Woodlands, TX (US); Ashley H. Gorakhpurwalla, Tomball, TX (US)

(73) Assignee: Compaq Information Technologies Group, L.P., Houston, TX (US)

( * ) Notice: Subject to any disclaimer, the term of this patent is extended or adjusted under 35 U.S.C. 154(b) by 0 days.

(21) Appl. No.: 09/455,048

(22) Filed: Dec. 6, 1999

(51) Int. Cl.[7] .............................................. G06F 13/00
(52) U.S. Cl. .......................... 710/300; 710/313; 710/33
(58) Field of Search ................................ 710/311, 313, 710/314, 33, 34, 60, 300; 713/500, 501, 502, 503, 600, 601

(56) References Cited

U.S. PATENT DOCUMENTS

| | | | |
|---|---|---|---|
| 5,930,496 A | | 7/1999 | MacLaren et al. .......... 395/500 |
| 6,081,143 A | * | 6/2000 | Ho et al. .................... 327/166 |
| 6,189,058 B1 | * | 2/2001 | Jones, III et al. ........... 710/103 |
| 6,272,582 B1 | * | 8/2001 | Streitenberger et al. .... 710/305 |
| 6,295,568 B1 | * | 9/2001 | Kelly et al. ................. 710/305 |

* cited by examiner

Primary Examiner—Peter Wong
Assistant Examiner—Tim Vo
(74) Attorney, Agent, or Firm—Conley, Rose & Tayon, P.C.; Michael F. Heim

(57) ABSTRACT

A system is disclosed for facilitating operation of a peripheral bus, such as a PCI bus, that operates at multiple clock speeds. The system includes an expansion slot controller that identifies the number of peripheral devices that have been installed in the expansion slots, and further determines whether these devices support high speed operation. The expansion slots transmit a signal indicating the presence of a peripheral device in the slot, and also transmit a signal indicating whether the device is operable at the higher clock frequency. Once the expansion slot controller determines this information, it decides whether operation at the higher frequency is supported by the peripheral devices and by the bus bridge. The expansion slot controller informs each peripheral device of what the operating frequency will be, and transmits a signal to the PCI bus bridge indicating if high frequency operation will be supported.

45 Claims, 3 Drawing Sheets

SYSTEM FOR INCORPORATING MULTIPLE EXPANSION SLOTS IN A VARIABLE SPEED PERIPHERAL BUS

CROSS-REFERENCE TO RELATED APPLICATIONS

Not applicable.

STATEMENT REGARDING FEDERALLY SPONSORED RESEARCH OR DEVELOPMENT

Not applicable.

BACKGROUND OF THE INVENTION

1. Field of the Invention

The present invention relates generally to a system for supporting peripheral components that couple to a high speed peripheral bus, such as a PCI bus. More particularly, the present invention relates to a system which checks the capability of peripheral components to operate at particular clock frequencies of the peripheral bus. Still more particularly, the present invention relates to a system which includes a plurality of expansion slots coupled to a variable speed peripheral bus, and that determines which clock frequency to use for the bus based upon the characteristics of the devices that populate the expansion slots.

2. Description of the Prior Art

FIG. 1 is a block diagram that illustrates a prior art computer system 10 including a microprocessor (CPU) 12, a system memory 14, and a bus bridge 16. A local bus 18 couples the microprocessor 12 to the bus bridge 16. A memory bus 20 couples system memory 14 to bus bridge 16. A first peripheral device 22 and a second peripheral device 24 are coupled to the bus bridge 16 through a peripheral bus 25.

The peripheral bus 25 may comprise a high performance PCI bus capable of supporting a plurality of PCI master and slave devices. Thus, the peripheral device 22 may comprise PCI Master controller that is capable of asserting ownership of the PCI bus during PCI Master cycles. The PCI master device 22 may comprise a local area network (LAN) device that connects other computer systems to peripheral bus 25, or could be embodied by an expansion bus interface that connects peripheral bus 25 to other peripheral buses. A second peripheral device 24 also is shown coupled to the peripheral bus 25. Peripheral device 24 may comprise a PCI slave device, such as a disk controller device or an audio controller device, for example. In accordance with normal convention, the PCI peripheral devices may be coupled via expansion slots to the PCI bus, thus permitting the user to configure the computer system 10 by adding peripheral devices to the system that are capable of coupling to the PCI bus.

The microprocessor 12 shown in FIG. 1 may comprise one or more of any of the various Intel Pentium-class microprocessors, and the local bus 18 could comprise a Pentium style local bus. Other style microprocessors and/or local bus architectures may be used without departing from the principles of the present invention. Details regarding the various bus cycles and protocols of the Pentium local bus 18 are not discussed in detail herein, as they are well known by those in the art, and are available in numerous publications.

The bus bridge 16 provides a standard interface between the CPU local bus 18 and the PCI bus 25. As such, the bus bridge 16 orchestrates the transfer of data, address, and control signals between two buses. PCI bus 25 typically comprises a high performance peripheral bus that includes multiplexed data/address lines, and which supports burst-mode transfers. Additional features regarding the PCI bus are described in the publication "PCI Local Bus Specification," Revision 2.2, Dec. 18, 1998, PCI Special Interest Group, Hillsboro, Oreg. the details of which are incorporated by reference herein.

As set forth in Revision 2.2 of the "PCI Local Bus Specification," the PCI bus comprises a synchronous bus with a generally uniform clock. The PCI bus clock signal typically is generated by circuitry in the bus bridge 16 and transmitted via the PCI CLK line to each of the devices resident on the PCI bus 25. Although shown in FIG. 1 as a separate signal line, as one skilled in the art will understand the PCI CLK line may comprise one of the signal lines in the PCI bus 25.

Relatively recent modifications to the PCI Bus Specifications have been made to permit operation of the bus at higher clock speeds. See generally Chapter 7 of the PCI Local Bus Specification, Revision 2.2. One problem with implementing a high speed PCI bus is that some PCI peripheral devices, particularly those devices developed in the past, simply are not capable of operating at the higher clock speeds. For many years the PCI bus was only capable of 33 MHz operation. Consequently, peripheral devices intended for coupling to a PCI bus were designed during this period to operate at 33 MHz. Because of this limitation, such peripheral devices may be incapable of operation at higher speed environments, such as at the 66 MHz clock speed available today. Use of these slower speed peripheral devices may cause the entire bus to malfunction if the PCI bus is operated at 66 MHz.

To address this problem, a 66 MHz ENABLE control line is included as part of the PCI bus 25, as shown in FIG. 1. The 66 MHz ENABLE line couples to a voltage source $V_{cc}$, and to each PCI slot provided in the system. If a peripheral device inserted in a PCI slot is incapable of 66 MHz operation, the 66 MHz ENABLE pin on the peripheral device connects to ground to pull the 66 MHz ENABLE line low. This, in turn, is detected by the bus bridge 16, which responds by slowing the operating speed of the bus to 33 MHz. In this manner, the bus bridge only drives a 66 MHz clock if all peripheral devices support 66 MHz operation.

While the use of the 66 MHz ENABLE line addresses some of the concerns regarding incompatible clock speeds, there still remain some problems that result from the use of a peripheral bus capable of operating at multiple speeds. One problem is that the bus bridge may be unable to drive the faster data and control signals to multiple expansion slots. As noted in Chapter 7 of the "PCI Local Bus Specification," Revision 2.2, the "66 MHz PCI requires faster timing parameters and redefined measurement conditions. As a result, 66 MHz PCI buses may support smaller loading and trace lengths." Thus, the 66 MHz clocking of the PCI bus mandates fewer peripheral devices and shorter leads to the peripheral devices. Consequently, computer systems that support dual 33 MHz/66 MHz operation on the same PCI bus must typically limit the number of available PCI slots to prevent too many 66 MHz devices from being connected to the PCI bus, Because of the loading and trace limitations of the 66 MHz bus, some manufacturers of bus bridges and associated chipsets recommend that a computer system only include two PCI slots to prevent more than two 66 MHz peripheral devices from being coupled to the PCI bus bridge. This approach to handling the problem of loading at higher clock frequencies can be Draconian. A user who desires to run more than two peripheral devices at the slower clock frequency (i.e. 33 MHz) cannot do so, even though the system would support these devices, because not enough expansion slots are provided. Thus, limiting the number of expansion slots to overcome limitations in driving peripheral devices at higher frequencies penalizes the user desiring more expansion slots at slower clock frequencies.

It would be advantageous if a system were developed which could include more slots than could be driven at the higher clock frequency, and which would reduce the frequency of the bus clock if an excessive number of peripheral components were installed in the expansion slots. Preferably, the system would detect the capabilities of the installed peripheral components and adjust the clock frequency of the bus to the highest possible setting based upon those capabilities, and the capability of the bus bridge to drive the data and control signal to the populated expansion slots. Despite these and other readily apparent advantages of such a system, to date no such system has been developed.

SUMMARY OF THE INVENTION

The present invention solves the shortcomings and deficiencies of the prior art by providing a computer system that automatically determines whether a peripheral device is present in each expansion slot, and whether each device is capable of high clock frequency (such as, for example, 66 MHz) operation. If any PCI device cannot operate at the high clock frequency or if the bus bridge is incapable of driving the number of devices present at the higher clock frequency, the system automatically drives the PCI bus clock signal at a standard, lower frequency (such as, for example, 33 MHz). Conversely, if the PCI devices present are operable at the higher frequency and the bus bridge can drive the higher speed bus to the number of installed peripheral devices, the system operates the PCI bus clock signal at the higher frequency (66 MHz, for example).

The present invention includes a bus bridge which orchestrates the transfer of address and data signals between the PCI bus and a local bus. The bus bridge preferably includes a clock driver, which generates the PCI bus clock signal, at a frequency dependent on the status of a high frequency enable (66 MHz ENABLE in the preferred embodiment) line. An expansion slot controller couples to each PCI expansion slot and to the 66 MHz ENABLE line. The 66 MHz ENABLE line is asserted high by the expansion slot controller if the system supports operation at 66 MHz. The expansion slot controller determines if a peripheral device is present in an expansion slot, and also determines if the device is capable of supporting operation at the higher clock frequency. After determining the status of each expansion slot, the expansion slot controller determines if all of the peripheral devices can support high frequency operation, and also determines if the bus bridge can drive the number of devices present. Based upon this determination, the expansion slot controller can drive the 66 MHz ENABLE line low to indicate that the PCI bus must be operated at a lower frequency, or can drive the 66 MHz ENABLE line high. If the 66 MHz ENABLE line is deasserted by the expansion slot controller, the bus bridge drives the PCI bus signals at a standard clock frequency, such as 33 MHz. Conversely, if the expansion slot controller does not drive the 66 MHz ENABLE line low, then the bus bridge drives the PCI bus signals at the higher frequency, such as 66 MHz.

BRIEF DESCRIPTION OF THE DRAWINGS

For a more detailed description of the preferred embodiment of the present invention, reference will now be made to the accompanying drawings, wherein.

Figure 1:
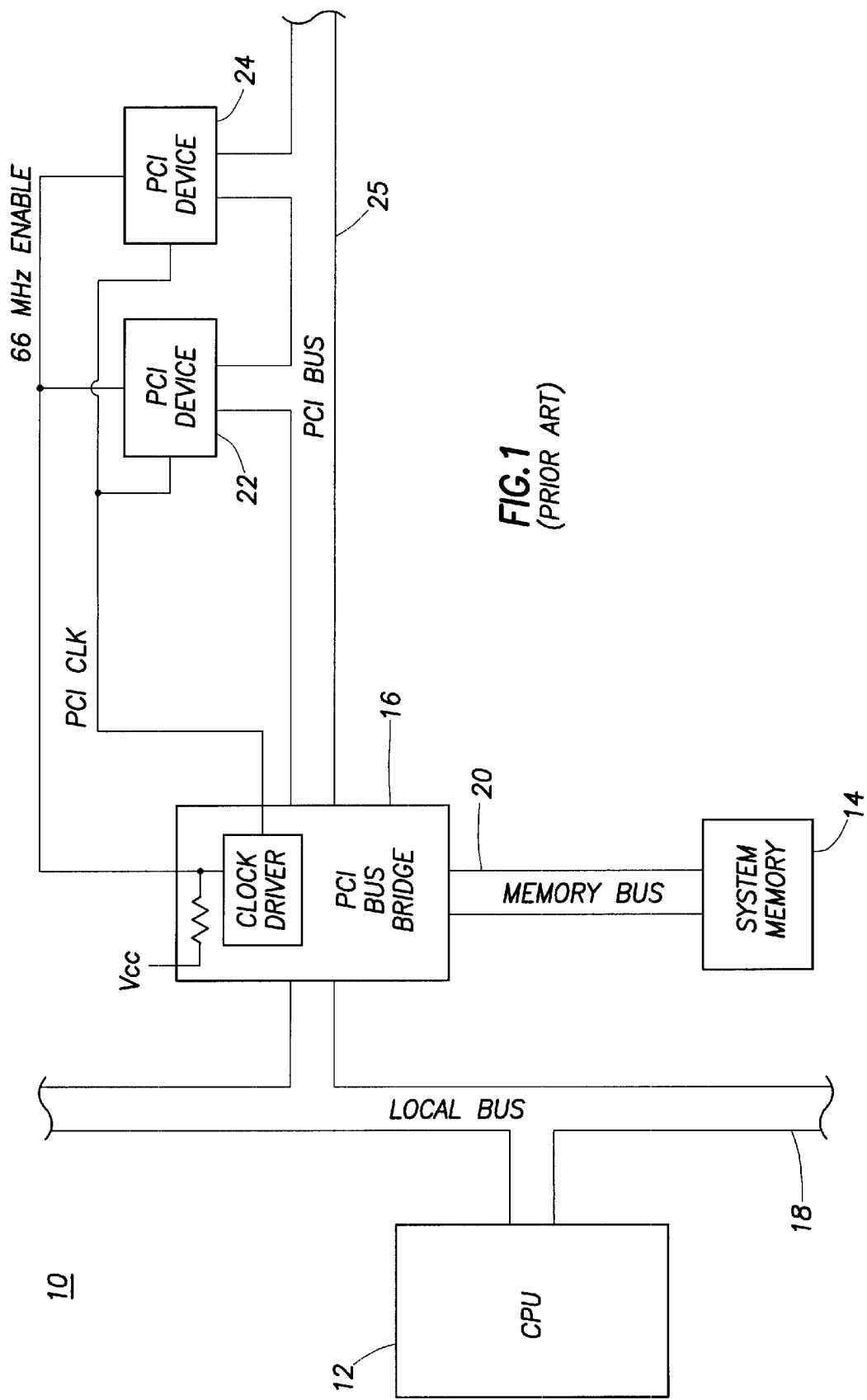
FIG. 1 depicts a prior art computer system implementing a peripheral bus system, such as a PCI bus, that is capable of operating at multiple clock frequencies.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENT

Figure 2:
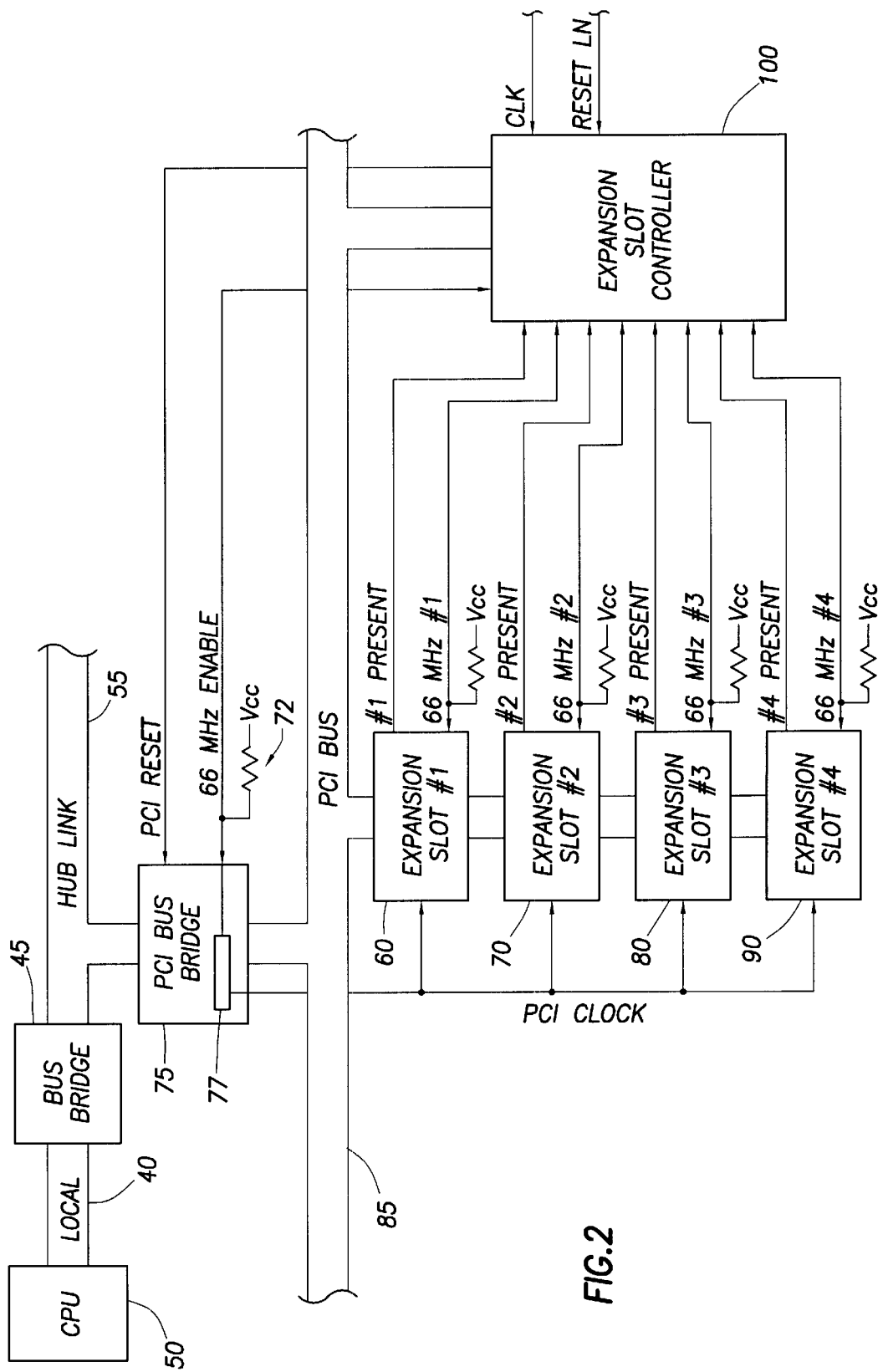
FIG. 2 shows a computer system implementing an expansion bus system constructed in accordance with the preferred embodiment of the present invention.

Referring now to FIG. 2, a computer system constructed in accordance with the preferred embodiment generally comprises a central processing unit (CPU) 50 connected to a local bus 40, a PCI bus 85, a bus bridge 75 capable of interfacing data, address, and control signals between a Hub Link bus 55 (or local bus 40) and the PCI bus 75, and multiple expansion slots 60, 70, 80 and 90 connected to the PCI bus 75. In addition, an expansion slot controller 100 couples to the expansion slots 60, 70, 80 and 90 to determine the presence and capabilities of the peripheral devices installed in the expansion slots. The CPU 50, bus bridge 75 and expansion slot controller 100 preferably reside on the system "motherboard," although any or all of these devices could be located on other circuit boards that couple to the motherboard. Further, while FIG. 2 depicts four expansion slots, it should be understood that the present invention is not limited to any particular number of expansion slots, and thus greater or fewer expansion slots may be provided in the system as desired. Other components may also be provided in the computer system, but have been omitted from FIG. 2 for the sake of simplicity.

In the preferred embodiment, the CPU core 50 implements a Pentium based microprocessor instruction set and the local bus 40 comprises a Pentium-style local bus. It should be understood, however, that the CPU core 50 could be configured to implement other microprocessor-type instruction sets without departing from the principles of the present invention. In addition, in the preferred embodiment the Intel Carmel 840 Chipset, is implemented. This chipset includes a bus bridge 45 interfacing a Hub-link bus 55, which couples to the PCI bus bridge. Alternatively, the system could be implemented with other chipsets that couple the local bus directly to the PCI bus bridge, or through other intermediate bus structures.

As will be understood by one skilled in the art, the bus bridge 75 provides a standard interface between the Hub Link bus 55 and the PCI bus 85. As such, the bus bridge 75, in conjunction with bus bridge 45, orchestrates the transfer of signals between the CPU 50 and PCI bus 85. The bus bridge 75 preferably includes conventional circuitry that controls well known interfacing functions such as orchestrating and transferring signals between the Hub Link bus and devices coupled to PCI bus 85.

Referring still to the preferred embodiment of the invention shown in FIG. 2, the bus bridge 75 preferably includes a clock driver circuit 77 and a status register (not shown) in accordance with normal convention. The clock driver 77 generates a PCI bus clock signal which is provided on a PCI CLOCK line to each of the devices resident on the PCI bus 85. The signal on PCI CLOCK line operates as the clocking signal for the PCI peripheral devices 60, 70, 80 and 90. The expansion slot controller 100 preferably operates based on a separate clock. In accordance with the principles of the preferred embodiment, the clock driver 77 is capable of generating clocking signals of at least two different frequencies. Thus, in the preferred embodiment, clock driver 77 generates clocking signals at 33 MHz and 66 MHz, although one skilled in the art will understand that the present invention contemplates clocking signals at other or additional frequencies that may be used in the future. The clock driver 75 preferably connects to a high frequency enable line (referred to in the preferred embodiment as 66 MHz ENABLE) which identifies the clock frequency to be driven by clock driver 77. If the 66 MHz ENABLE line is asserted, then the clock driver 55 drives the PCI bus clock signal at a frequency of approximately 66 MHz. Conversely, if the 66 MHz ENABLE line is deasserted, the clock driver 55 drives the PCI bus clock signal at a frequency of approximately 33 MHz. Thus, in the preferred embodiment, the speed at which the PCI bus clock signal is driven by clock driver 77 is dependent on the status of the 66 MHz ENABLE line.

As shown in the system of FIG. 2, the 66 MHz ENABLE input preferably passively connects to a voltage supply $V_{cc}$ though a pull-up resistor 72. Thus, in low speed PCI peripheral devices (such as devices operating at 33 MHz), the 66 MHz ENABLE line connects to ground, while in 66 MHz devices the 66 MHz ENABLE line passively connects to the supply voltage. As one skilled in the art will realize, the 66 MHz ENABLE line and the PCI CLOCK line may be provided as part of the PCI bus 85, or could be provided as separate sideband signals. These lines, together with the PCI Reset line have been shown separate from the PCI bus 85 in FIG. 2 only for the sake of clarity.

Each of the PCI devices in the computer system include a designated PCI connector pin. Preferably, the PCI connector pin comprises pin 49, side B, which on 33 MHz devices is bused as a ground. High frequency peripheral devices (which in the preferred embodiment are the devices capable of operating at 66 MHz), "no connect" to this pin, which is pulled to $V_{cc}$ by a pull-up resistor on the system board.

Referring still to FIG. 2, four expansion slots 60, 70, 80, and 90 are shown for supporting up to four PCI peripheral devices. As noted above, more or less expansion slots may be provided. Each of the expansion slots 60, 70, 80 and 90 connects to the PCI bus 85 and to the PCI CLOCK lines, respectively. As shown in FIG. 2, each of the expansion slots includes a 66 MHz enable pin, but in the preferred embodiment this pin does not connect directly to the 66 MHz ENABLE line of the PCI bus. Instead, the 66 MHz enable pin on each of the expansion slots connects electrically to the expansion slot controller 100. In the preferred embodiment, each of the 66 MHz enable pins connect separately to the expansion slot controller 100, as shown in FIG. 2. Thus, as in FIG. 2, a 66 MHz #1 line connects between expansion slot #1 (element 60 in FIG. 2) and the expansion slot controller 100. In similar fashion, the 66 MHz enable pin for each of the other expansion slots connects to the expansion slot controller through a separate signal line, labeled as 66 MHz #2, 66 MHz #3, and 66 MHz #4, respectively.

Figure 3:
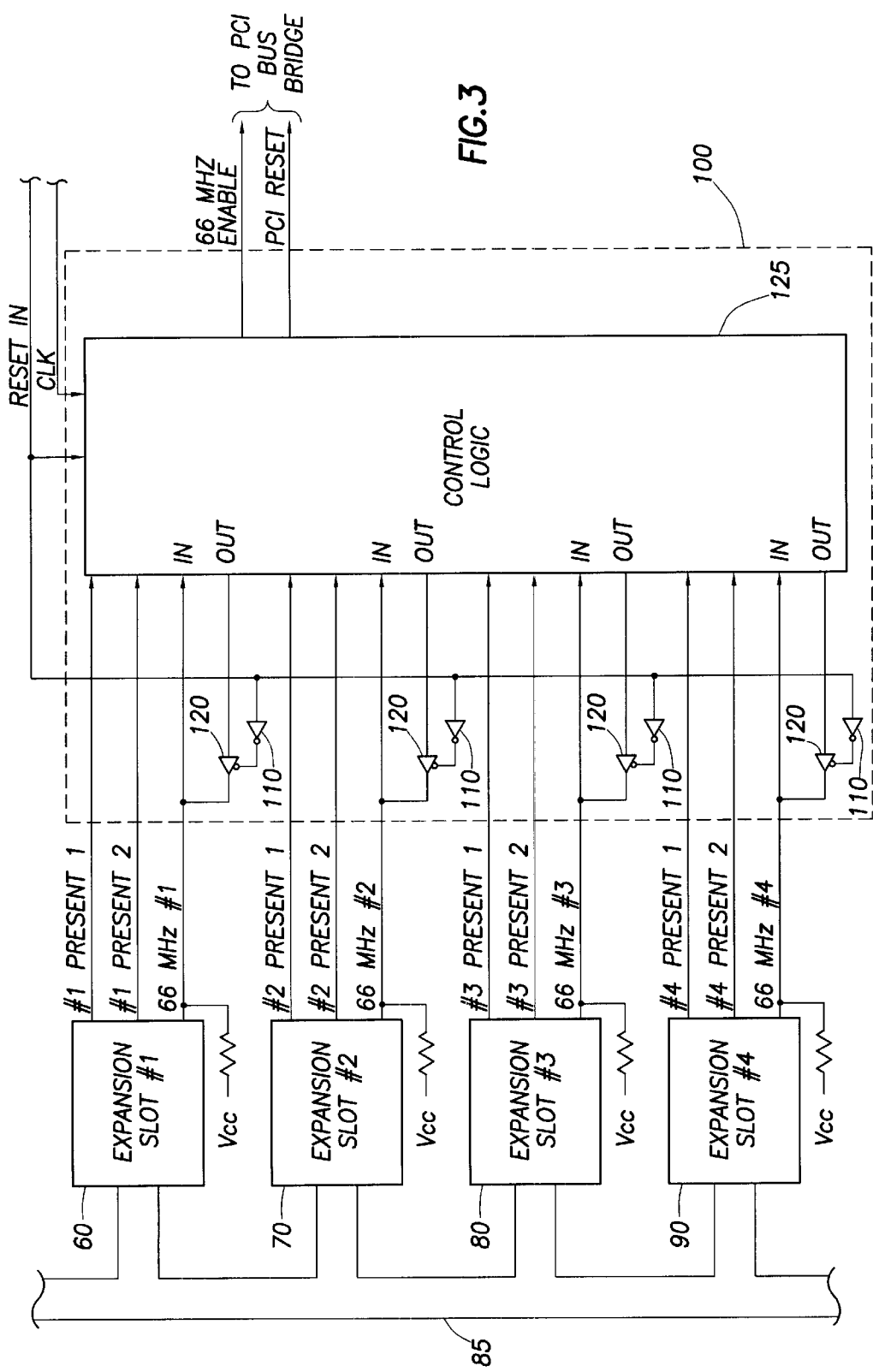
FIG. 3 is a block diagram illustrating in further detail the expansion slot controller of FIG. 2, in accordance with the preferred embodiment.

Referring now to FIGS. 2 and 3, each of the expansion slots also includes an electrical pin hat indicates whether a peripheral device has been installed in that particular slot. Thus, for example, expansion slot #1 (item 60) produces a "present" signal transmitted via PRESENT #1 signal line to the expansion slot controller 100. In similar fashion, each of the other expansion slots transmit a "present" signal to the expansion slot controller over signal lines PRESENT #2, PRESENT #3, and PRESENT #4, respectively. See generally Chapter 4.4 of the PCI Local Bus Specification, Revision 2.2, at page 146. In the preferred embodiment as shown in FIG. 3, the "present" signal is obtained from the control lines (PRSNT1# and PRSNT2#) that indicate the amount of power to be supplied to the device. Two control lines are provided for this function in Revision 2.2 of the PCI Local Bus Specification to indicate three different power levels—25 Watt maximum, 15 Watt maximum, and 7.5 Watt maximum. These three power levels may be encoded as 01 (open/ground), 10 (ground/open) or 11 (ground/ground) on the two control lines. Thus, the presence of any of these signals indicates a device is present in the expansion slot. Conversely, if the expansion slot controller 100 detects a 00 (open/open) on the PRSNT1# and PRSNT2# signal lines, this indicates no device is present in that particular expansion slot.

Referring still to FIGS. 2 and 3, the expansion slot controller 100 couples to the PCI bus 85, and in particular the 66 MHz ENABLE signal line and the PCI Reset signal line that form part of the PCI bus. In the preferred embodiment, the expansion slot controller 100 does not couple to all the lines of the PCI bus. The expansion slot controller 100 couples to each of the expansion slots 60, 70, 80, and 90 via separate present lines (that can be implemented using existing PRSNT pins on the expansion slots) and via separate 66 MHz enable lines. As shown in FIGS. 2 and 3, he 66 MHz enable signal preferably comprises a bidirectional signal to enable the expansion slot controller 100 to receive an indication from the expansion slot as to the capability of the peripheral device to support the high clock frequency, and to transmit a signal back to the peripheral device as to which clock frequency will be used on the PCI CLOCK line. This bidirectional functionality of the 66 MHz enable signal can be implemented in several ways in controller 100, as will be apparent to one skilled in the art. One example of implementing the bidirectional 66 MHz line for the controller 100 is shown in FIG. 3. As shown in FIGS. 2 and 3, the 66 MHz enable lines between the expansion slot controller 100 and the expansion slots are passively pulled high by a pull-up resistor connected to a Voltage source, $V_{cc}$. If a peripheral device is installed in an expansion slot that is only operable at the slower operating speed, the 66 MHz enable line is pulled low.

As shown in FIG. 3, in the preferred embodiment the expansion slot controller 100 preferably includes a programmable control logic 125 that connects electrically to a clock (CLK) signal line and a Reset signal line. In the preferred embodiment these signal lines form part of a second expansion bus that operates at a fixed clock speed. Thus, for example, in the preferred embodiment the Reset In and CLK signals are received from a fixed speed 33 MHz PCI bus. As an alternative, the expansion slot controller may be modified to receive the Reset signal and clock signal from the dual speed PCI bus 85, if so desired. The control logic 125 couples to a separate 66 MHz enable signal line (one for each expansion slot). Four such slots are shown in FIG. 3, for purposes of illustration. The control logic 125 includes an input terminal coupled directly to the 66 MHz enable line, and an output terminal that couples to the 66 MHz enable line via a tri-state buffer 120. The state of the tri-state buffer is controlled by the output of the Reset In signal, after it has been inverted in inverter 110. The tri-state buffer transmits the signal from the control logic 125 that appears on the output terminal when enabled by the Reset In signal. When not enabled by Reset In signal, the tri-state buffer 120 provides a high impedance to permit the control logic to sample the 66 MHz line has been pulled low by the peripheral device indicating the peripheral device must operate at the low clock speed.

In the preferred operation, the control logic 125 receives the Reset In signal, and samples the state of each of the PRSNT lines to determine if a peripheral device is available in any of the expansion slots. Simultaneously, the control logic 125 samples each of the 66 MHz enable lines connected to the expansion slots to determine if the devices present support high frequency operation (the buffer 120 being disabled by the low assertion of the Reset In signal). If the device supports high speed operation, the sampled 66 MHz enable line will be passively asserted high. If the device cannot support high speed operation, it will pull the 66 MHz enable line low. The control logic also samples the 66 MHz ENABLE line to determine if any other peripheral device has pulled that line low, indicating that the PCI bus must operate at low speed. The control logic 125 then makes a decision within a proscribed time period as to whether the PCI CLOCK signal should operate at the low or high speed. If the decision is made to operate at high speed, the control logic 125 transmits a high logic signal on the 66 MHz enable lines to the expansion slots via the output terminals. At the same time, the control logic 125 asserts a high voltage signal on the 66 MHz ENABLE line to the PCI bus bridge. If low speed operation is required, the control logic 125 transmits a low logic signal to the expansion slots via the output terminals, while also pulling the 66 MHz ENABLE line low to indicate to the PCI bus bridge that low frequency operation is required.

The control logic 125 preferably comprises a programmable array logic (or PAL) device that can be programmed by a user. Although a PAL device is used in the preferred embodiment, other electronic components could also be used. Thus, for example, a microprocessor or other programmable device also could be used instead of the PAL device. Alternatively, combinatorial logic circuitry could also be used to produce the desired output on the 66 MHz ENABLE line based upon the signals received from each of the expansion slots.

The operation of the control logic 125 may be determined in various fashions. One way to determine the control logic 125 operation is to program the logic (or construct circuitry) that implements a truth table that determines operating speed based upon the status of each expansion slot. One example of a truth table for a system with four expansion slots, based upon the notion that only two 66 MHz devices can be supported, is shown in Table I. This table assumes that the system will operate at 33 MHz is any peripheral devices are installed in the expansion slots that are incapable of supporting 66 MHz operation. In table I, "not present" indicates that no device has been installed in that slot; "33 MHz installed" indicates a device supporting only low speed operation has been installed in the expansion slot; "66 MHz installed" indicates a device supporting high speed operation has been installed in the slot; and "X" indicates a "don't care" condition where the state of the device in the slot does not impact the decision of which clock speed to implement.

TABLE I

| SLOT #1 | SLOT #2 | SLOT #3 | SLOT #4 | DESIRED CLOCK FREQUENCY |
|---|---|---|---|---|
| 33 MHz installed | X | X | X | 33 MHz operation |
| X | 33 MHz installed | X | X | 33 MHz operation |
| X | X | 33 MHz installed | X | 33 MHz operation |
| X | X | X | 33 MHz installed | 33 MHz operation |
| 66 MHz installed | Not present | Not present | Not present | 66 MHz operation |
| Not present | 66 MHz installed | Not present | Not present | 66 MHz operation |
| Not present | Not present | 66 MHz installed | Not present | 66 MHz operation |
| Not present | Not present | Not present | 66 MHz installed | 66 MHz operation |
| 66 MHz installed | 66 MHz installed | Not present | Not present | 66 MHz operation |
| 66 MHz installed | Not present | 66 MHz installed | Not present | 66 MHz operation |
| 66 MHz installed | Not present | Not present | 66 MHz installed | 66 MHz operation |
| 66 MHz installed | 66 MHz installed | 66 MHz installed | Not present | 33 MHz operation |
| 66 MHz installed | 66 MHz installed | Not present | 66 MHz installed | 33 MHz operation |
| 66 MHz installed | Not present | 66 MHz installed | 66 MHz installed | 33 MHz operation |
| 66 MHz installed | 66 MHz installed | 66 MHz installed | 66 MHz installed | 33 MHz operation |
| Not present | 66 MHz installed | 66 MHz installed | Not present | 66 MHz operation |
| Not present | 66 MHz installed | Not present | 66 MHz installed | 66 MHz operation |
| Not present | 66 MHz installed | 66 MHz installed | 66 MHz installed | 33 MHz operation |

TABLE I-continued

| SLOT #1 | SLOT #2 | SLOT #3 | SLOT #4 | DESIRED CLOCK FREQUENCY |
|---|---|---|---|---|
| Not present | Not present | 66 MHz installed | 66 MHz installed | 66 MHz operation |

As an alternative to constructing a truth table, a flow chart or state diagram could be developed to outline the operation of the control logic 125. Regardless of how the control logic 125 is programmed or designed to operate, other parameters could also be considered as part of the decision-making process, such as the length of the traces to the slots, the ambient environment of the computer structure, and the like.

The following software code is one example of a method to program a PAL device to operate in accordance with the preferred embodiment:

```
MODULE milanpal
TITLE 'Milan Sys Managment PAL MACH4A-32/32';
"    lattice comment - plsi property 'Y1_AS_RESET OFF';
"PIN DEFINITIONS
    "INPUTS
    clkin      PIN 5;
    resetin_   PIN 14;
    s1_prs1_   PIN 42;
    s1_prs2_   PIN 11;
    s2_prs1_   PIN 3;
    s2_prs2_   PIN 1;
    s3_prs1_   PIN 41;
    s3_prs2_   PIN 12;
    "BIDIRECTIONAL
    s1_m66PIN 31;
    s2_m66PIN 9;
    s3_m66PIN 35;
    "OUTPUTS
    p64h_m66   PIN 13;
    resetout_  PIN 44;
    "CONSTANTS
    VCC = 1;
    GND = 0;
    Z = .Z.;
    X = .X.;
    C = .C.;
    s1_present = (!s1_prs1_ # !s1_prs2_);
    s2_present = (!s2_prs1_ # !s2_prs2_);
    s3_present = (!s3_prs1_ # !s3_prs2_);
    all_66 = (s1_m66 & s2_m66 & s3_m66);
    "REGISTER DEFINITIONS
    rstff0, rstff1    NODE ISTYPE 'buffer, reg_d';
    m66ff             NODE ISTYPE 'buffer, reg_d';
EQUATIONS
    rstff0.clk = clkin;
    rstff1.clk = clkin;
    m66ff.clk = clkin;
    rstff0.d = resetin_;
    rstff1.d = rstff0.q;
    resetout_ = rstff1.q;
    !m66ff.d = resetin_ & !m66ff.q
        # ! resetin_ & (s1_present & s2_present & s3_present)
        # ! resetin_ & !all_66;
    s1_m66.oe = resetin_;
    s2_m66.oe = resetin_;
    s3_m66.oe = resetin_;
    p64h_m66.oe = resetin_;
    s1_m66 = m66ff.q;
    s2_m66 = m66ff.q;
    s3_m66 = m66ff.q;
    p64h_m66 = m66ff.q;
TEST_VECTORS
([clkin,resetin_,s1_prs1_,s1_prs2_,s2_prs1_,s2_prs2_,s3_prs1_,s3_prs2_,s1_m66,s2_m66,s3_m66] —>
        [p64h_m66,resetout_,s1_m66,s2_m66,s3_m66])
//[Clock,Resetin,Slot Pres (1-3),Slot M66EN's (1-3)]   —>
[P64H_M66EN,Resetout,Slot M66EN's (1-3)]
    [  C  ,  0  ,1,0,1,1,1,1,   1,1,1   ] —> [  Z  ,  0  , Z,Z,Z    ];
    [  C  ,  1  ,X,X,X,X,X,X,   X,X,X   ] —> [  1  ,  0  , 1,1,1    ];
```

-continued

```
      [    C  ,  1   ,X,X,X,X,X,X,  X,X,X   ] —> [  1  ,   1  ,
1,1,1                  ];
      [    C  ,  0   ,1,0,1,1,1,1,   0,1,1  ] —> [  Z  ,   1  ,
Z,Z,Z                  ];
      [    C  ,  1   ,X,X,X,X,X,X,  X,X,X   ] —> [  0  ,   0  ,
0,0,0                  ];
      [    C  ,  1   ,X,X,X,X,X,X,  X,X,X   ] —> [  0  ,   1  ,
0,0,0                  ];
      [    C  ,  0   ,0,0,1,1,0,0,   1,1,1  ] —> [  Z  ,   1  ,
Z,Z,Z                  ];
      [    C  ,  1   ,X,X,X,X,X,X,  X,X,X   ] —> [  1  ,   0  ,
1,1,1                  ];
      [    C  ,  1   ,X,X,X,X,X,X,  X,X,X   ] —> [  1  ,   1  ,
1,1,1                  ];
      [    C  ,  0   ,0,1,1,1,0,0,   1,1,1  ] —> [  Z  ,   1  ,
Z,Z,Z                  ];
      [    C  ,  1   ,X,X,X,X,X,X,  X,X,X   ] —> [  1  ,   0  ,
1,1,1                  ];
      [    C  ,  1   ,X,X,X,X,X,X,  X,X,X   ] —> [  1  ,   1  ,
1,1,1                  ];
      [    C  ,  0   ,1,0,0,1,0,1,   1,1,1  ] —> [  Z  ,   1  ,
Z,Z,Z                  ];
      [    C  ,  1   ,X,X,X,X,X,X,  X,X,X   ] —> [  0  ,   0  ,
0,0,0                  ];
      [    C  ,  1   ,X,X,X,X,X,X,  X,X,X   ] —> [  0  ,   1  ,
0,0,0                  ];
END
```

While a preferred embodiment of the invention has been shown and described, modifications there of can be made by one skilled in the art without departing from the spirit of the invention. For example, the preferred embodiment characterizes low clock signal frequency as 33 MHz, and high clock signal frequency as 66 MHz. In addition, it should be noted that the present invention is not intended to be limited to use with expansion slots. The present invention can also be used in a system with high frequency embedded devices. It should be understood that the principles of the present invention are applicable to any peripheral bus system which is operable generally at a low and a high frequency clock, regardless of the particular frequency rates.

What is claimed is:

1. A computer system, comprising:
   a CPU connected to a local bus;
   a peripheral bus capable of operating at a low clock frequency and a high clock frequency;
   a bus bridge coupled to said local bus and to said peripheral bus for orchestrating the transfer of data and address signals between said local bus and said peripheral bus, said bus bridge including a clock driver that drives a peripheral bus clock signal at either the low clock frequency or the high clock frequency;
   a plurality of expansion slots coupled to the peripheral bus into which peripheral devices can be installed;
   an expansion slot controller coupled to the plurality of expansion slots by separate control lines, with each of the plurality of expansion slots providing a signal indicating if a peripheral device has been installed in the slot and whether any installed device can operate at the high clock frequency;
   wherein said expansion slot controller determines the clock frequency for the peripheral bus based upon the number of expansion slots in which peripheral devices have been installed, and the capability of the installed peripheral devices to operate at the higher clock frequency, and said expansion slot controller transmits a signal to said clock driver indicating the frequency at which said clock driver should drive said peripheral bus clock signal.

2. A system as in claim 1, wherein said expansion slot controller selects the low frequency clock signal if more than a predetermined number of peripheral devices are installed.

3. A system as in claim 2, wherein said expansion slot controller selects the low frequency clock signal if any peripheral device is incapable of operating at the high clock frequency.

4. A system as in claim 3, wherein the control lines coupling each of said expansion slots to said expansion slot controller includes a high frequency enable signal line between each expansion slot and said expansion slot controller.

5. A system as in claim 4, wherein the control lines coupling each of said expansion slots to said expansion slot controller includes a present signal line between each expansion slot and said expansion slot controller that identifies if a peripheral device is installed in the associated slot.

6. A system as in claim 5, wherein said present signal line comprises two signal lines that connect to PRSNT pins on said expansion slot.

7. A system as in claim 5, wherein said high frequency enable signal line is bi-directional, and said expansion slot controller transmits a signal to each installed peripheral device identifying the peripheral bus clock frequency to be used.

8. A system as in claim 5, wherein said plurality of expansion slots includes at least three expansion slots capable of receiving peripheral devices operable at either the low clock frequency or the high clock frequency.

9. A system as in claim 5, wherein said plurality of expansion slots includes more slots than can be driven by the bus bridge at the high clock frequency.

10. A system as in claim 5, wherein said plurality of expansion slots includes at least four expansion slots capable of receiving peripheral devices.

11. A system as in claim 7, wherein said peripheral bus comprises a PCI bus, and the low frequency clock signal operates at approximately 33 MHz and the high frequency clock signal operates at approximately 66 MHz.

12. A system as in claim 9, wherein said expansion slot controller transmits the signal to said clock driver indicating the frequency at which said clock driver should drive said peripheral bus clock signal via an enable signal line.

13. A system as in claim 11, wherein said expansion slot controller samples the high frequency enable line and the present line and determines the clock frequency for the PCI bus based upon the number of peripheral devices installed, the capability of the installed peripheral devices to operate at 66 MHz, and the ability of the bus bridge to drive the number of peripheral devices installed.

14. A computer system, comprising:
   a central processing unit connected to a local bus;
   a PCI bus;
   a bus bridge coupled to said local bus and to said PCI bus for orchestrating the transfer of data and address signals between said local bus and said PCI bus, said bus bridge including a clock driver that drives a PCI clock signal on the PCI bus at one of at least two different frequencies;
   a plurality of expansion slots coupled to said PCI bus, with a peripheral PCI device installed in at least one of said expansion slots;
   an expansion slot controller coupled to the plurality of expansion slots by separate control lines, with the expansion slot in which the peripheral device is installed providing a signal indicating that the peripheral device has been installed in the slot and further indicating the clock frequency at which the installed peripheral device is capable of operating;
   wherein said expansion slot controller determines the clock frequency for the PCI bus based upon the number of peripheral devices installed in expansion slots, and the capability of the installed peripheral devices to operate at the clock frequencies, and said expansion slot controller transmits a signal to said clock driver indicating the frequency at which said clock driver should drive the PCI bus clock signal.

15. A system as in claim 14, wherein said clock frequencies include a low frequency clock signal and a high frequency clock signal, and wherein said expansion slot controller only selects the high frequency clock signal if all installed peripheral devices are capable of operating at the high frequency, and the bus bridge is capable of driving the data signals to the installed peripheral devices at the high frequency.

16. A system as in claim 15, wherein said PCI bus includes a high frequency enable line connected to said clock driver, said bus bridge and to said expansion slot controller.

17. A system as in claim 15, wherein said expansion slot controller selects the low frequency clock signal if more than a predetermined number of peripheral devices are installed.

18. A system as in claim 15, wherein said expansion slot controller selects the low frequency clock signal if the peripheral devices are installed in expansion slots in which the traces between the bus bridge and expansion slot are excessively long.

19. A system as in claim 15, wherein said expansion slot controller selects the low frequency clock signal if any peripheral device is incapable of operating at the high clock frequency.

20. A system as in claim 15, wherein the control lines coupling each of said expansion slots to said expansion slot controller includes a high frequency enable signal line between each expansion slot and said expansion slot controller.

21. A system as in claim 15, wherein said plurality of expansion slots includes at least three expansion slots capable of receiving PCI peripheral devices operable at either the low clock frequency or the high clock frequency.

22. A system as in claim 15, wherein said plurality of expansion slots includes more slots than can be driven by the bus bridge at the high clock frequency.

23. A system as in claim 15, wherein said plurality of expansion slots includes at least four expansion slots capable of receiving PCI peripheral devices.

24. A system as in claim 16, wherein said high frequency enable line is passively asserted by said expansion slot controller if the clock driver and peripheral devices can accommodate the high frequency bus clock signal.

25. A system as in claim 20, wherein the control lines coupling each of said expansion slots to said expansion slot controller includes a present signal line between each expansion slot and said expansion slot controller that identifies if a peripheral device is installed in the associated slot.

26. A system as in claim 25, wherein said present signal line comprises two signal lines that connect to PRSNT pins on said expansion slot.

27. A system as in claim 26, wherein said high frequency enable signal line is bi-directional, and said expansion slot controller transmits a signal to each installed peripheral device identifying the PCI bus clock frequency to be used.

28. A system as in claim 27, wherein the low frequency clock signal operates at approximately 33 MHz and the high frequency clock signal operates at approximately 66 MHz.

29. A system as in claim 28, wherein said expansion slot controller samples the high frequency enable line and the present line and determines the clock frequency for the PCI bus based upon the number of peripheral devices installed, the capability of the installed peripheral devices to operate at 66 MHz, and the ability of the bus bridge to drive the number of peripheral devices installed.

30. A computer system, comprising:
   a PCI bus;
   a bus bridge coupled to said PCI bus for controlling data transactions on said PCI bus, said bus bridge including a clock driver that drives a PCI clock signal on the PCI bus at one of at least two different frequencies;
   a plurality of expansion slots coupled to said PCI bus, with each of said plurality of expansion slots capable of coupling a peripheral device to said PCI bus;
   an expansion slot controller coupled to the plurality of expansion slots by signal lines, with each of the expansion slots providing a signal indicating if a peripheral device has been installed in the slot and further indicating the clock frequencies at which the installed peripheral device is capable of operating;
   wherein said expansion slot controller determines the clock frequency for the PCI bus based upon the number and type of peripheral devices installed in expansion slots.

31. A system as in claim 30, wherein said clock frequencies include a low frequency clock signal and a high frequency clock signal, and wherein said expansion slot controller only selects the high frequency clock signal if all installed peripheral devices are capable of operating at the high frequency, and the bus bridge is capable of driving the data transactions to the installed peripheral devices.

32. A system as in claim 31, wherein said PCI bus includes a high frequency enable line connected to said bus bridge and said expansion slot controller.

33. A system as in claim 31, wherein said expansion slot controller selects the low frequency clock signal if more than a predetermined number of peripheral devices are installed.

34. A system as in claim 31, wherein said expansion slot controller selects the low frequency clock signal if the peripheral devices are installed in expansion slots in which the traces between the bus bridge and expansion slot are excessively long.

35. A system as in claim 31, wherein the low frequency clock signal operates at approximately 33 MHz and the high frequency clock signal operates at approximately 66 MHz.

36. A system as in claim 32 wherein said high frequency enable line is asserted by said expansion slot controller if the clock driver and peripheral devices can accommodate the high frequency bus clock signal.

37. A system as in claim 33, wherein the type of installed devices consists of those capable of operating at the high clock frequency, and those that cannot, and said expansion slot controller selects the low frequency clock signal if any peripheral device are of the type that are incapable of operating at the high clock frequency.

38. A system as in claim 35, wherein said expansion slot controller samples the high frequency enable line and the present line and determines the clock frequency for the PCI bus based upon the number of peripheral devices installed, the capability of the installed peripheral devices to operate at 66 MHz, and the ability of the bus bridge to drive the number of peripheral devices installed.

39. A system as in claim 37, wherein the control lines coupling each of said expansion slots to said expansion slot controller includes a high frequency enable signal line between each expansion slot and said expansion slot controller.

40. A system as in claim 38, wherein said plurality of expansion slots includes at least three expansion slots capable of receiving PCI peripheral devices operable at either the low clock frequency or the high clock frequency.

41. A system as in claim 38, wherein said plurality of expansion slots includes more slots than can be driven by the bus bridge at the high clock frequency.

42. A system as in claim 38, wherein said plurality of expansion slots includes at least four expansion slots capable of receiving PCI peripheral devices.

43. A system as in claim 39, wherein the control lines coupling each of said expansion slots to said expansion slot controller includes a present signal line between each expansion slot and said expansion slot controller that identifies if a peripheral device is installed in the associated slot.

44. A system as in claim 43, wherein said present signal line comprises two signal lines that connect to PRSNT pins on said expansion slot.

45. A system as in claim 44, wherein said high frequency enable signal line is bi-directional, and said expansion slot controller transmits a signal to each installed peripheral device identifying the PCI bus clock frequency to be used.

* * * * *